United States Patent [19]

Nichols

[11] Patent Number: 4,800,558
[45] Date of Patent: Jan. 24, 1989

[54] TELEPHONE SWITCHING SYSTEM FRAME SYNC GENERATOR

[75] Inventor: Mark A. Nichols, Las Vegas, Nev.

[73] Assignee: Pathfinder Systems, Inc., Las Vegas, Nev.

[21] Appl. No.: 21,235

[22] Filed: Mar. 3, 1987

[51] Int. Cl.[4] .............................................. H04J 3/02
[52] U.S. Cl. ......................................... 370/67; 328/62
[58] Field of Search ............... 370/67, 64, 66; 328/62, 328/63, 72; 377/76

[56] References Cited

U.S. PATENT DOCUMENTS

| | | | |
|---|---|---|---|
| 3,920,897 | 11/1975 | Grant et al. | 328/62 |
| 3,983,495 | 9/1976 | Epstein | 328/62 |
| 4,419,918 | 12/1983 | Dyck et al. | 328/62 |
| 4,594,705 | 6/1986 | Yahata et al. | 370/67 |
| 4,601,029 | 7/1986 | Hargrave et al. | 370/67 |
| 4,645,947 | 2/1987 | Prak | 328/62 |

OTHER PUBLICATIONS

Millman, "Microelectronics", pp. 220–231, McGraw-Hill Book Company, 1979.

Primary Examiner—Robert L. Griffin
Assistant Examiner—Min Jung
Attorney, Agent, or Firm—Freilich, Hornbaker, Rosen & Fernandez

[57] ABSTRACT

A circuit is described for use in a telephone switching system, for generating a large number of frame sync pulses that are progressively offset in time from one another, and that each control the operation of a pair of codecs (coder/decoder circuits). A high frequency clock signal is divided to generate a series of square waves that are 2's multiples of the lowest frequency square wave, such as 8 kHz, 16 kHz, 32 kHz, 64 kHz, and 128 kHz. These square waves are inputted to an integrated circuit of a type commonly used for addressing, to generate pulses on the several outputs at controlled different times, these pulses being delivered to the codecs. A plurality of such integrated circuits are used, with the inverse of the lower frequencies also being generated, and with different combination of the lower frequencies and their inverses delivered to different ones of the integrated circuits.

1 Claim, 2 Drawing Sheets

TELEPHONE SWITCHING SYSTEM FRAME SYNC GENERATOR

BACKGROUND OF THE INVENTION

An organization which places a large number of long distance telephone calls can reduce their long distance charges by directing the calls through appropriate long distance carrier. For example, many long distance carriers have charge schedules wherein the cost of all calls made on a particular WATTS line during a predetermined period are reduced by a certain amount when a number of calls exceeds a preset level. There has arisen a demand for telephone switching systems which can economically control the routing of local telephone calls (which may be received through a local telephone company) to appropriate long distance carrier lines.

The above type of telephone switching system may include a large number of local voice signal lines that are each connected to a separate input codec (coder/decoder). Each input codec samples its input at a different instant during a cycle, and transmits a corresponding digital signal over a bus to a crosspoint circuit. From the crosspoint circuit, the signals travel to another bus to each of a large number of output codecs that can each sample the bus at an appropriate instant during the cycle, convert the digital sample to an analog voice signal, and deliver the voice signal to a chosen line of a chosen long distance carrier. In order to allow a digital byte or frame generated by an input codec, to be picked up by the appropriate output codec, both codecs must be activated at precisely the same time in each cycle. A different synchronizing line is connected to each input codec and a corresponding output codec, and a pulse generator is required to generate a pulse at a predetermined different time on each synchronizing line. A circuit which could generate such pulses on each of a large number of synchronizing lines, with a minimum of low cost parts, would aid in minimizing the cost of such telephone switching systems.

SUMMARY OF THE INVENTION

In accordance with one embodiment of the present invention, a telephone switching system is provided, of a type which includes groups of codecs arranged progressively, and which are enabled at progressive frame sync times during each cycle, wherein a frame sync generator of relatively simple construction is provided for generating the synchronizing pulses. The frame sync generator includes a clock for generating a high frequency clock signal, and a divider which generates a plurality of square wave signals, or pulses, of different frequencies, wherein progressively higher frequencies are 2's multiples of a lowest frequency. These frequencies are delivered to an integrated circuit of a type which has a plurality of input lines that each represents a bit of predetermined significance, and that has a plurality of output lines that each carries a square wave only while the binary signals on its input lines define a predetermined number.

Where each integrated circuit has a limited number of outputs such as eight, a larger number of synchronizing lines can be produced by using several integrated circuits. The inverse of the lowest frequency outputs of the divider are generated, and various combinations of an inverse or noninverse low frequency with another inverse of a different low frequency is delivered to each integrated circuit.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
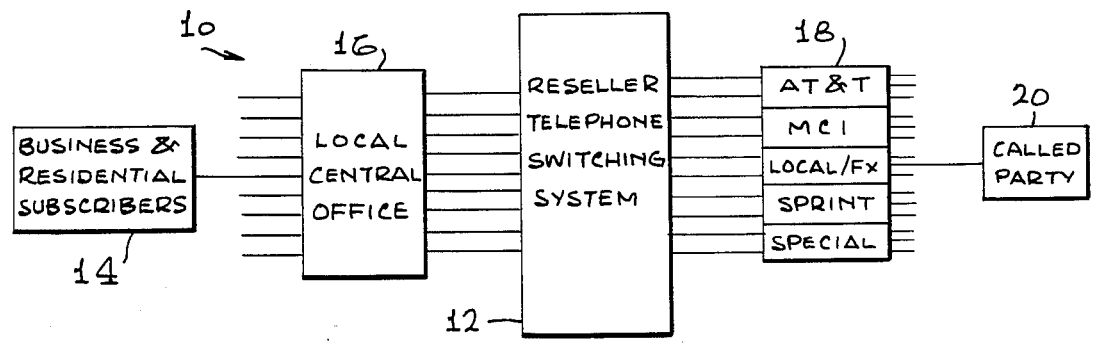
FIG. 1 is a telephone network which includes a telephone switching system of the present invention.

FIG. 1 illustrates a telephone switching network 10 wherein a telephone switching system 12 of the present invention is used by a reseller of long distance telephone calls. The reseller receives telephone calls from subscribers 14 through a local telephone central office 16. The switching system 12 routes each call through any one of a number of WATTS lines or the like offered by any one of a number of long distance carriers 18 to a party 20 called by the subscriber 14. The switching system 12 routes the telephone lines to those lines of long distance carriers which will result in a minimal overall cost to the owner of the switching system for all calls made by subscribers.

Figure 2:
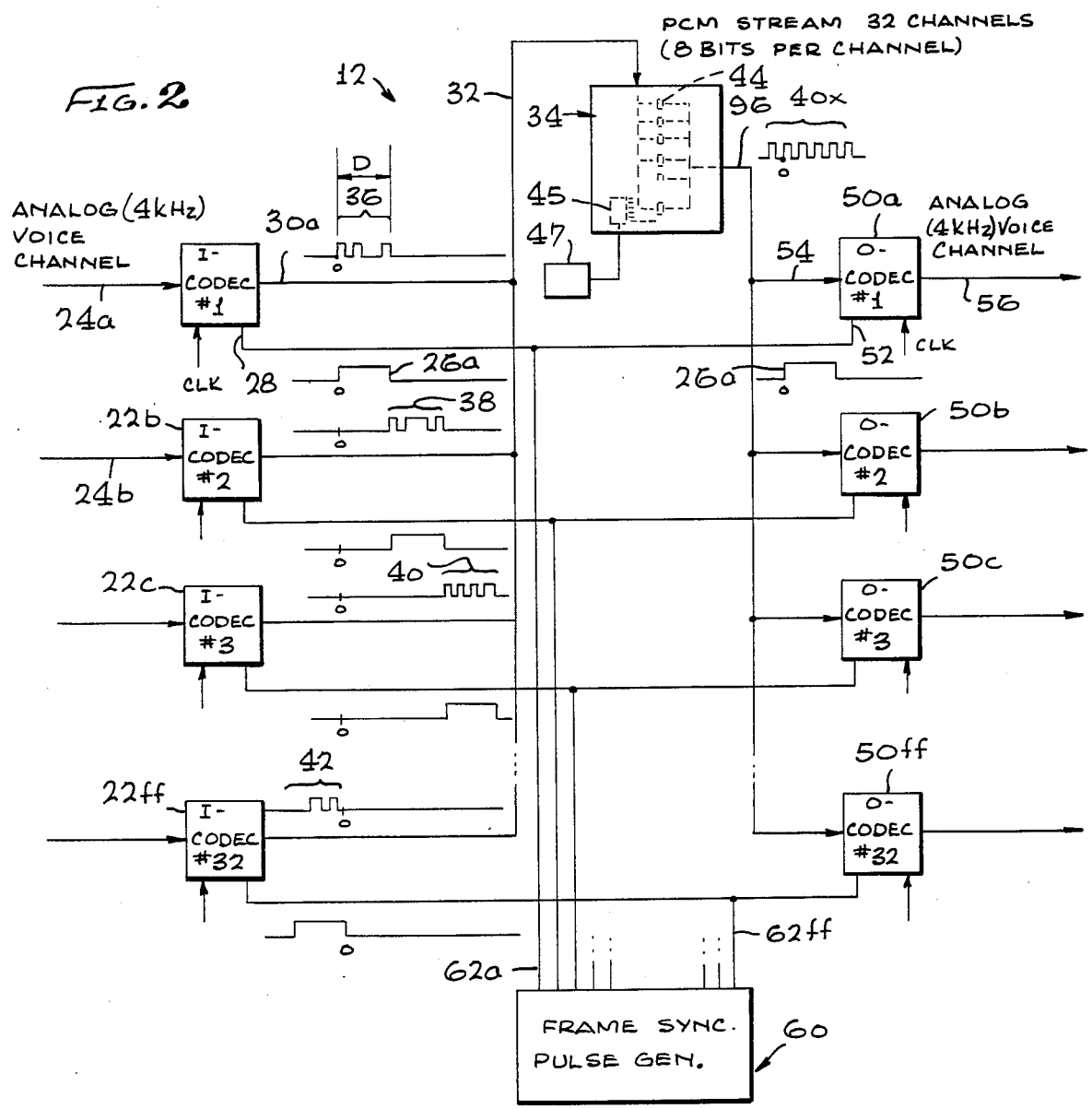
FIG. 2 is a view of a portion of a telephone switching system of the present invention.

FIG. 2 illustrates a portion of the telephone switching system 12. The system includes numerous input convertors or codecs (coder/decoder) 22 which each includes an analog voice channel 24 that can receive a call from a subscriber, which is to be routed to a distant called party. In the particular portion of the system shown in FIG. 2, thirty-two input codecs 22a–22ff are shown. During the time when each codec such as 22a receives a synchronizing pulse 26 on a synchronizing input 28, the codec samples the signal on its analog input 24a and generates an 8-bit signal or word on its output 30a representing the amplitude of the analog input. The 8-bit word or byte on line 30 is delivered through a bus 32 to a time-slot interchanger 34.

In the circuit of FIG. 2, each byte such as 36 from an input codec has a duration D of about 8 microseconds. Immediately after the first input codec 22a has delivered a byte on the bus 32, the next input codec 22b delivers a byte 38 on its output, representing the amplitude of the analog signal on its input 24b. Successive codecs similarly sample the analog signal on their input and deliver an 8-bit byte representing the amplitude on their output to the bus 32. This continues until the last or thirty-second input codec 22ff has sampled its input and delivered a byte 42 on its output. If no signals are to be transmitted in the reverse direction from the called party to the calling party, the sampling can be repeated, while in the usual situation where the called party is answering, there is a delay before the sampling by the thirty codecs repeats.

The time-slot interchanger 34 receives the 8-bit bytes from the thirty-two input codecs in a serial manner, and stores the bytes in an internal register indicated at 44. Under control of a lookup table 45 which can be changed by a microprocessor 47, these bytes are then delivered to an output bus 46 which is connected to each of thirty-two output codecs 50a–50ff. When each output codec such as 50a receives a synchronizing pulse such as 26 on its input 52, the output codec takes in the 8-bit byte on the output bus 46, received on the input line 54 of the codec, and converts it to an analog signal delivered on its output line 56. Similarly, the other output codecs receive a byte on the output bus 46 during a different limited time period (about 8 microseconds) during each cycle (of 256 microseconds) and delivers an analog signal on its output 56. By means of the synchronizing pulses on a line such as 62a, which are delivered to two corresponding codecs 22a,50a, the two corresponding codecs are controlled so as the input codec 22a samples the input data, the corresponding output codec 50a processes the data sent to the time-slot interchanger during the previous cycle. The time-slot interchanger 34 determines which input codec is "connected" to which output codec, by shifting the time in each cycle when a byte from an input codec 22 is placed on the output bus 46.

Figure 3:
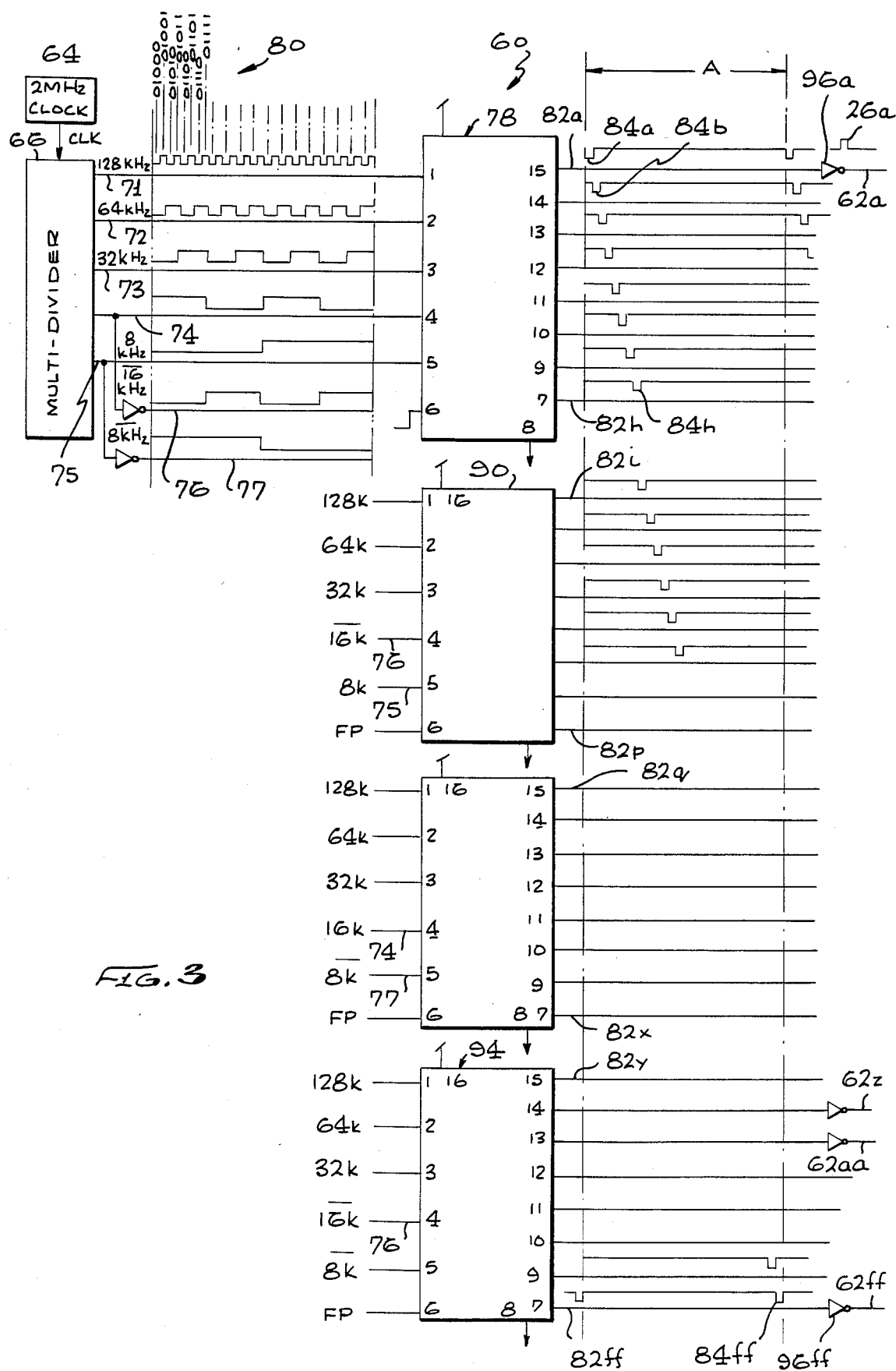
FIG. 3 is a diagram of a frame synchronous pulse generator of the system of FIG. 2.

The synchronizing square waves 26 are generated by a frame sync pulse generator 60. In FIG. 2, the generator 60 has 32 output lines, and generates a pulse lasting eight microseconds, sequentially on its output lines 62a-62ff. FIG. 3 illustrates details of the pulse generator 60 and the waveforms generated by it. The pulse generator includes a 2 mHz clock 64 whose output is delivered to a multi-divider 66. The divider 66 has five outputs 71-75, with the lowest frequency output 75 having a square wave of a repetition rate or frequency of 8 kHz, and with the other outputs carrying square waves that are 2's multiples of the low frequency output. The trains of pulses of these five outputs 71-75 are delivered to five input pins "1" to "5" of an LS 138 integrated circuit 78. One suitable type is SN54HC138 3-Line to 8-Line Decoder/Demultipleyer sold by Texas Instruments. The waveforms of the square waves on lines 71-75 are shown, and can be considered as representing binary numbers, with a high signal representing "zero," a low signal representing "1," and with line 71 being the least significant digit. In that case, the bits on lines 71-73 represent counts of "zero" to "8" in binary form, as indicated at 80. In the particular integrated circuit, the pins "4" and "5" must respectively carry a "one" and a "zero" to generate an output on lines 82. The integrated circuit 78 has eight output lines 82a-82h which carry pulses 84a-84h that are each of 8 microseconds duration and that appear in sequence at different times during a cycle of duration A of 256 microseconds (8×32).

In order to generate pulses on the other thirty-two lines 82i-82ff, three additional LS 138 integrated circuits 90-94 are provided. The first three pins "1" to "3" of each additional integrated circuit 90-94 are coupled to the divider outputs 71-73. Applicant also generates, on lines 76 and 77, inverses of the 16 kHz and 8 kHz outputs of lines 74 and 75. Each of the four possible combinations of the 8 kHz and 16 kHz and their inverses are delivered to the "4" and "5" pins of the integrated circuit 78 and 90-94. The result is the generation of a pulse on each of the 32 lines 82a-82ff in sequence, each pulse having a duration of 8 microseconds and the sequence of pulses repeating after each cycle. It may be noted that the output of each integrated circuit such as 78 is a negative-going pulse. An invertor 96a-96ff is used along each of the thirty-two lines to convert the pulse to a positive-going pulse.

Thus, the invention provides a circuit for generating frame synchronizing pulses for a telephone switching system, which enables the generation of pulses in sequence on each of a large number of lines using relatively simple circuitry. The pulse generating circuit includes a high frequency clock, a multi-divider circuit for dividing the clock output to generate square waves of frequencies that are 2's multiples of one another, and an integrated circuit which delivers a pulse on each of its output lines only when the arithmetical count on its input lines is a predetermined number. The lowest frequency outputs of the multi-divider can be passed through invertors, to control additional similar integrated circuits that deliver pulses sequentially on their output lines at times different than the first integrated circuit.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In a telephone switching system which includes a group of codecs, a separate analog line coupled to each codec, a bus output line common to all codecs in said group, and a separate timing input line coupled to each codec, the improvement of means for generating timing signals on said timing input lines, comprising:

clock means for generating a high frequency clock signal;

divider means coupled to said clock means, for generating a plurality of substantially square wave signals including a first binary signal of a first low frequency and a plurality of additional binary signals of progressive 2's multiples of said first frequency, all synchronized to the first signal;

an integrated circuit which has a plurality of input lines that each represent a bit of predetermined significance and that each receive a different one of said binary signals, said integrated circuit also having a plurality of output lines that each carries a square wave only while the binary signals on its input lines define a predetermined number, whereby each of said output lines carries a square wave for a predetermined small minority of the time;

each of said output lines is connected to a different one of said plurality of codecs, to control each codec to operate during a different short period of time to sample the analog signal on its analog line and deliver a burst of binary signals on said bus representing the analog signal sample;

said system includes four of said integrated circuits;

said divider means includes means for generating the inverse of said first low frequency signal and the inverse of a second signal whose frequency is twice said low frequency;

each of said four integrated circuits receives a different combination of inverse and noninverse of said first low frequency signal and said second signal, with a first integrated circuit receiving said first and second signals, with a second integrated circuit receiving the noninverse of said first signal and the inverse of said second signal, with a third integrated circuit receiving the inverse of said first signal and the noninverse of said second signal, and with a fourth integrated circuit receiving the inverse of said first signal and the inverse of said second signal.

* * * * *